US 6,533,202 B1

(12) United States Patent
Koike (10) Patent No.: US 6,533,202 B1
(45) Date of Patent: Mar. 18, 2003

(54) COMPONENT MEMBER OF FISHING REEL (75) Inventor: Mamoru Koike, Saitama (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 09/562,311

(22) Filed: May 1, 2000

(30) Foreign Application Priority Data

Apr. 30, 1999 (JP) ............................................ 11-124115

(51) Int. Cl.[7] ............................................... A01K 89/015

(52) U.S. Cl. ...................................... 242/310; 242/900

(58) Field of Search ................................ 242/310, 311, 242/900

(56) References Cited

FOREIGN PATENT DOCUMENTS

JP 09168352 6/1997

OTHER PUBLICATIONS

Japanese Patent Abstract, Pub. No. 09168352, Jun. 30, 1997.

*Primary Examiner*—Emmanuel Marcelo
(74) *Attorney, Agent, or Firm*—Liniak, Berenato & White (57) ABSTRACT

A component member of a fishing reel incorporating a body constituted by a Mg alloy; and a corrosion prevented layer formed on the body by a high-voltage anodization process or a body constituted by a Mg alloy; a corrosion prevented layer formed on the body by a high-voltage anodization process or conversion treatment; and a sealing layer which is formed on the corrosion prevented layer by an impregnating process and which is free from any change in the dimension thereof.

3 Claims, 5 Drawing Sheets

COMPONENT MEMBER OF FISHING REEL

BACKGROUND OF THE INVENTION

1. Field of the Invention

The present invention relates to a component member of a body (the body, the cover, the rotor and the frame) and the handle of a spinning reel for fishing.

2. Related Art

Hitherto, use of a magnesium material to constitute the member of a fishing reel has been investigated and embodied from viewpoints of increasing the strength, reducing the weight and facilitating molding.

Since the fishing reel is distinct from products for other technical fields, and the fishing reel is used in a very severe environment in which sea-water and water adhere to the fishing reel. Therefore, satisfactory contrivances must be employed.

In consideration of the foregoing circumstance, a method has been disclosed in JP-A-9-168352. In this disclosure, the component member of the fishing reel formed by a magnesium alloy is anodized to form a corrosion prevented layer. Then, resin coating, such as electrodeposition or spray coating, is performed to obtain required corrosion resistance and satisfactory quality of decoration.

As described above, the Mg alloy is subjected to the anodizing and resin coating by the electrodeposition or spraying. Thus, if the fishing reel is used in a fishing spot which is in the severe environment, required corrosion resistance can be realized. However, the dimensions of the surface coating layer cannot easily be realized with high accuracy such that dispersion of the dimension is prevented.

If the Mg alloy is employed by focusing attention on the characteristics that the Mg alloy is a strong and light-weight material, an accurate component member for a reel cannot be obtained. To realize a metallic appearance, over coating of metallic paint must be performed. In the foregoing case, it is difficult to control the dimensions of the coating on the surface of the component member in high accuracy. Moreover, the coating process becomes too complicated.

SUMMARY OF THE INVENTION

In view of the foregoing, an object of the present invention is to provide a component member of a fishing reel which exhibits satisfactory corrosion resistance and strength even in a severe environment.

The inventors of the invention has focused attention on the characteristics of a magnesium material. That is, the magnesium material exhibits high strength, very light weight and satisfactory moldability. Moreover, the surface of the magnesium material is subjected to a high-voltage anodization process to form a corrosion prevented layer or a sealing layer on the corrosion prevented layer formed by the anodization process. Thus, a fact has been detected that satisfactory corrosion resistance can be realized even in a severe environment in which sea-water and water easily adhere and the fishing gear is easily damaged owing to a rock or the like. Hence it follows that the present invention has been achieved.

That is, according to the present invention, there is provided a component member of a fishing reel comprising: a body constituted by a Mg alloy; and a corrosion prevented layer formed on the body by a high-voltage anodization process.

According to the present invention, there is provided a component member of a fishing reel including: a body constituted by a Mg alloy; a corrosion prevented layer formed on the body by an anodization process or conversion treatment; and a sealing layer which is formed on the corrosion prevented layer by an impregnating process and which is free from any change in the dimension thereof.

The component member of a fishing reel may have a structure that the sealing layer is constituted by an organic material or ceramics.

According to the present invention, there is provided a component member of a fishing reel including: a body formed by a Mg alloy; a corrosion prevented layer formed on said body; and an organic coating layer formed on said corrosion prevented layer, the organic coating layer formed by dry coating method.

DETAILED DESCRIPTION OF PREFERRED EMBODIMENTS

A component member of a fishing reel according to the present invention includes a body formed by a Mg alloy; and a corrosion prevented layer formed on the body.

In the present invention, the Mg alloy is exemplified by an alloy of a type composed of Al, Zn or Mn.

The body of the component member is exemplified by a reel body, a cover, a rotor and a handle for a fishing reel and a frame and side plates of a center impeller type feel. It is preferable that the body of the component member is molded by a die-cast method or a thixomolding method using the Mg alloy.

The die-cast may be a usual cold chamber method or a hot chamber method. It is preferable that the hot chamber method is employed because of a quick manufacturing cycle.

To adjust the surface of the body of the component member, the body of the component member may be subjected to chemical surface treatment, such as grinding, shot blasting or barrel polishing or chemical surface treatment, such as cleaning with solvent, cleaning with alkaline solution or cleaning with acid solution.

The corrosion prevented layer according to the present invention is formed by a conversion treatment exemplified by a chromic acid process, a dichromate process, a zinc phosphate process, a manganese process, a non-chrome manganese process, a stannate process; or by coating or anodization process. The anodization process may be a HAE anodization process or a Dow 17 anodization process each of which is able to form a close anodization process.

The foregoing anodization process is able to form an anodized film incorporating close and hard MgO and a spinel structure which is a composite oxide structure. Therefore, excellent corrosion resistance can be imparted to the component member of a fishing reel.

As a more satisfactory anodization process, a high-voltage anodization process (for example, a MAGOXID process) is known. The foregoing high-voltage anodization process is an anodization method which is performed in organic electrolytic solution (for example, sulfuric acid, phosphoric acid, aluminate or the like) through the application of high voltage (for example, 200 V or higher).

As compared with the conventional anodization processes, such as the Dow 17 method and the HAE method, the foregoing methods are characterized in that the quantity of the MgO component in the composition of the coating film is large with respect to the spinel. Therefore, satisfactory corrosion resistance, wear resistance and the adhesive properties can be obtained. Hence it follows that damage which reaches the base portion does not easily occur. Moreover, contact corrosion does not easily occur.

The electrochemical corrosion test (DINSS50918) and the neutral salt spray test (DIN50021) were performed. As a result, the high-voltage anodization process has demonstrated corrosion resistance superior to that realized by the conventional anodization processes, such as the Dow 17 method and the HAE method. When a wear resistance test (a rubber test) and an adhesive property test (a punching test) were performed, the high-voltage anodization process demonstrated superior wear resistance and adhesive properties to those of the conventional methods such as the Dow 17 method and the HAE method.

The corrosion prevented layer formed by the anodization process contains the MgO component which develops in white in a large quantity. Therefore, aesthetically pleasant white appearance can be realized after the anodization process has been performed. Hence it follows that only a sealing process is required to realize a high-quality appearance without a necessity of performing overcoating, such as metallic coating. Since the white base member is employed, dyeing to various colors is permitted by using dyes or pigments.

It is preferable that the thickness of the coating film (the corrosion prevented layer) which is formed by the anodization process is 5 $\mu$m to 20 $\mu$m with which stable performance, (close and hard) can be realized. If the thickness is smaller than 5 $\mu$m, the hardness of the coating film is unsatisfactory. If the thickness is larger than 20 $\mu$m, there is apprehension that a crack occurs during growth of the coating film.

A part of the anodized film to be formed on the body of the component, where a member made of another metal material is brought into contact or is positioned adjacent to, preferably has the thickness thicker than the thickness of the other parts. The thickness of the other portions except for the portion with which the member made of another metal material is brought into contact is made to be, for example, 5 $\mu$m to 20 $\mu$m. Moreover, the thickness of the portion with which the member made of another metal member is brought into contact is made to be 10 $\mu$m to 20 $\mu$m.

A point of contact for use in the anodization process is preferably positioned at a portion which is free from any apprehension that corrosion occurs. The reason for this lies in that the thickness of the anodized film at the position at which the members are joined to each other is reduced.

In the present invention, it is preferable that the sealing layer is made of an organic material or ceramics. It is preferable that the sealing method is impregnation, a diffusion process or a sol and gel method. The foregoing processes are able to plug small apertures and small recesses. Therefore, change in the dimensions can be ignored.

The organic material for constituting the sealing layer is exemplified by a resin coating material, such as an epoxy material, a urethane material or an acrylic material. In particular, it is preferable that the epoxy or acrylic coating material is employed. Because satisfactory adhesive properties with the anodized film can be realized and the close coating film can be formed.

A sealing method of impregnation with resin is performed by: accommodating resin solution; introducing a container in which a member which must be processed is immersed in the resin solution into a vacuum furnace; reducing the pressure in the vacuum furnace (to, for example, 5 mmHg); applying pressure (to, for example, 5 kgf/cm$^2$ to 6 kgf/cm$^2$) to impregnate the member, which must be processed, with the resin; and drying the member at 80° C.

The ceramics for constituting the sealing layer is exemplified by silica, titanium oxide and the like. In particular, an impregnation process using polysilazane having a small molecular weight enables small apertures and recesses to be plugged with silica at a low temperature environment. Therefore, non-sealed portion can substantially be eliminated. excellent corrosion resistance can be realized. Example, the sealing method of impregnation with ceramics is performed by: immersing a member, which must be processed, in polysilazane having the small molecular weight; impregnating the member with polysilazane by using s capillary phenomenon; and drying the member at about 200° C.

The component member of a fishing reel according to the present invention may have a structure that a coating is applied to the sealing layer. Moreover, decoration may be provided when the sealing layer is formed to form a decorative sealing layer.

Examples of the present invention will now be described with reference to the drawings.

Example 1

Figure 1:
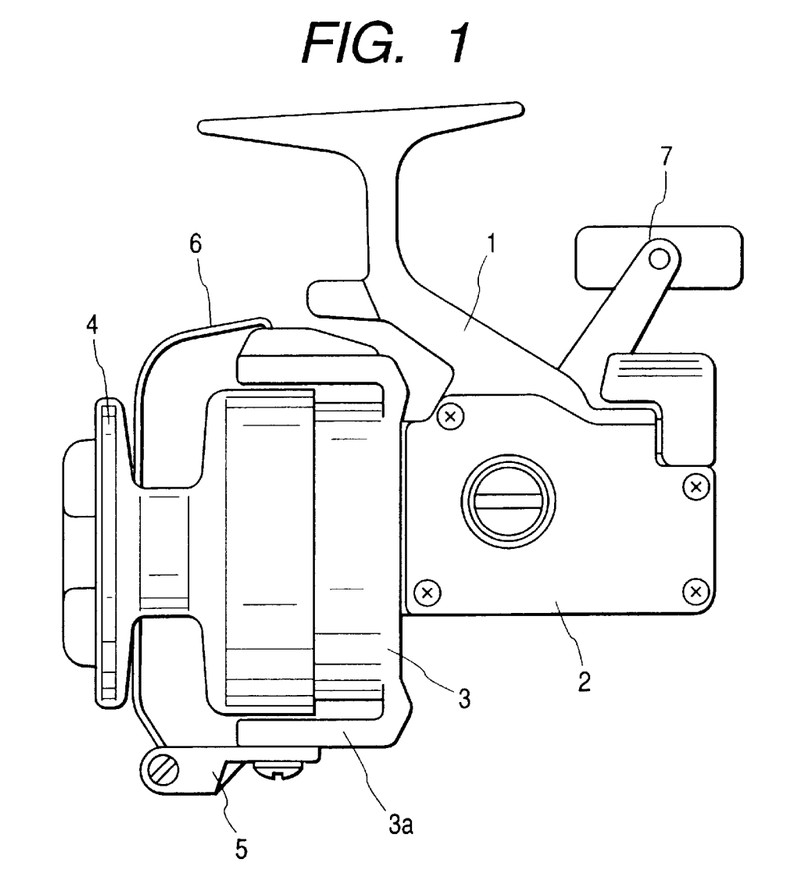
FIG. 1 is a diagram showing a first example of a fishing reel incorporating a component member according to the present invention.

FIG. 1 is a schematic view showing a component member of a spinning reel for fishing according to the present invention. Referring to FIG. 1, reference numeral 1 represents a reel body (a body of the component member). A side cover 2 is joined to the side surface of the reel body 1. A rotor 3 is secured to a rotational shaft (not shown) of the reel body 1. A spool 4 is mounted on a spool shaft (not shown) and is moved to forward and rearward with respect to the reel body 1.

The rotor 3 includes two projecting arms 3a. A bail support plate 5 is rotatively joined to the leading end of each of the projecting arms 3a. A bail 6, which is a fishing-line guide member, is joined to the bail support plate 5. A handle knob 7 for rotating the rotor 3 through a gear train mechanism (not shown) disposed in the reel body 1 is joined to the side portion of the reel body 1.

In the spinning reel for fishing having the above-mentioned structure, rotation of the handle knob 7 causes the rotor 3 to synchronously be rotated. It leads to a fact that the spool 4 is moved forwards/rearwards to reciprocate with respect to the reel body 1.

Figure 2:
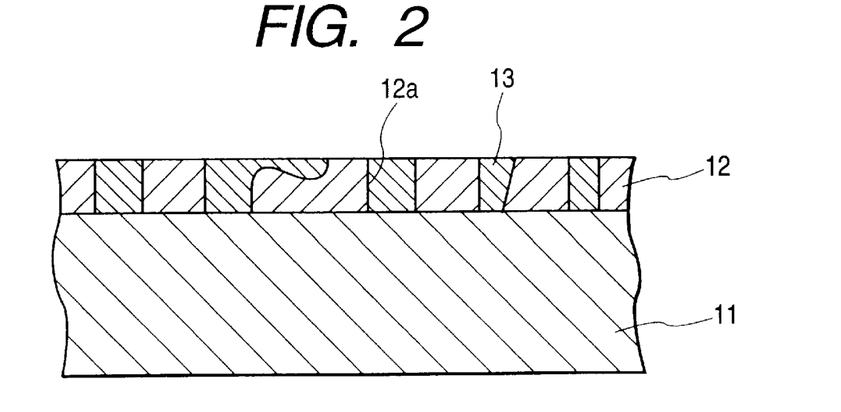
FIG. 2 is a diagram showing the cross section of an example of the component member of a fishing reel according to the present invention.

The reel body 1 is molded by the thixomolding method with which a Mg alloy containing Al by 3.5 wt % to 9.7 wt % is molded. As shown in FIG. 2, the reel body 1 incorporates a corrosion prevented layer 12 formed on the body 11. Moreover, the corrosion prevented layer 12 is impregnated with a sealing layer 13.

The corrosion prevented layer 12 is formed by injecting the body 11 into non-chrome manganese processing solution so as to subject the body 11 to conversion treatment. The sealing layer 13 is formed by an impregnating process using polysilazane having a small molecular weight. The sealing layer 13 is formed such that the inside portion of openings 12a and recesses in the chemical converted film forming the corrosion prevented layer 12, are filled with silica. Since the sealing layer 13 is formed by the impregnation process, change in the dimensions can be prevented.

The weight of the component member (the reel body) for the fishing reel structured as described above was about 30 g. The corrosion resistance of the component member was examined by performing a salt-spray test. As a result, no corroded portion was confirmed by a visual check. That is, the corrosion resistance similar to that of the conventional component member of a reel made of Al was realized. Therefore, excellent corrosion resistance was realized.

The reason why the excellent corrosion resistance was realized lies in that the sealing layer 13 has the excellent adhesive properties with the film formed by the conversion treatment, and is formed by close silica. In addition, the openings 12a and the recesses in the film formed by the conversion treatment are filled with silica.

As for the appearance, harmony among silver color of the film formed by the conversion treatment and the transparency and luster of silica of the sealing layer enables a quality of the metal to be realized.

Example 2

This example has a structure similar to that according to Example 1 except for a structure that the corrosion prevented layer is formed by a high-voltage anodization process and the sealing layer is formed by impregnation with acrylic resin.

The corrosion prevented layer 12 is formed by: introducing the body 11, removed the point of contact, into processing solution adjusted by using organic electrolytic solution; and subjecting the body 11 to a high-voltage anodization process under a condition that an electric current is passed for a predetermined time. The sealing layer 13 is formed by an impregnation process using acrylic resin. The sealing layer 13 is formed such that the inside portion of openings 12a and recesses in the converted film, which constitutes the corrosion prevented layer 12, are filled with silica. Since the sealing layer 13 is formed by the impregnation process, change in the dimensions can be prevented.

The weight of the component member (the reel body) for the fishing reel structured as described above was measured, thus resulting in 30 g. The corrosion resistance of the component member was examined by performing a salt-spray test. As a result, no corroded portion was confirmed by a visual check. That is, the corrosion resistance similar to that of the conventional component member of a reel made of Al was realized. Therefore, excellent corrosion resistance was realized.

The reason why the excellent corrosion resistance is realized lies in that the corrosion prevented layer 12 is formed by the anodized film having a spinel structure containing close MgO components in a large quantity. Moreover, the sealing layer 13 is formed by the close acrylic resin exhibiting excellent adhesive properties with the anodized film. Moreover, the openings 12a and the recesses in the film formed by the conversion treatment are filled with acrylic resin.

As for the appearance, harmony among white color of the anodized film and luster of the acrylic resin in the sealing layer enables aesthetically pleasing white appearance to be realized.

In Examples 1 and 2, the component member of a fishing reel is the reel body. The present invention may be applied to a case where the component member of a fishing reel is cover, a rotor, a handle and a frame and side plates of a center impeller type reel.

Comparative Example 1

A reel body was manufactured by an Al alloy containing Si by 9.6 wt % to 12.0 wt % molded by a die-cast method. The weight of the reel body was measured, resulting in 50 g. Thus, the weight was increased by 60% from the weight of the reel body according to the present invention and constituted by the Mg alloy.

Comparative Example 2

The reel bodies were manufactured by a Mg alloy containing Al by 3.5 wt % to 9.7 wt % molded by a die-cast method using a hot chamber. Then, the reel bodies were subjected to conversion treatment, for example, a chromic acid process, a dichromate process and a stannate process, respectively. Thus, corrosion protected films were formed.

The corrosion resistance of the obtained reel bodies were examined similarly to the examples. As a result, the reel body treated with the chromic acid had a corrosion area of about 4%, that treated with the dichromate had a corrosion area of about 2% and that treated with the stannate had a corrosion area of about 4%. Although the foregoing reel bodies were considered that the bodies was substantially sufficient for use in a severe environment, such as a fishing spot, but satisfactory corrosion prevented layer was not realized.

Example 3

Figure 3:
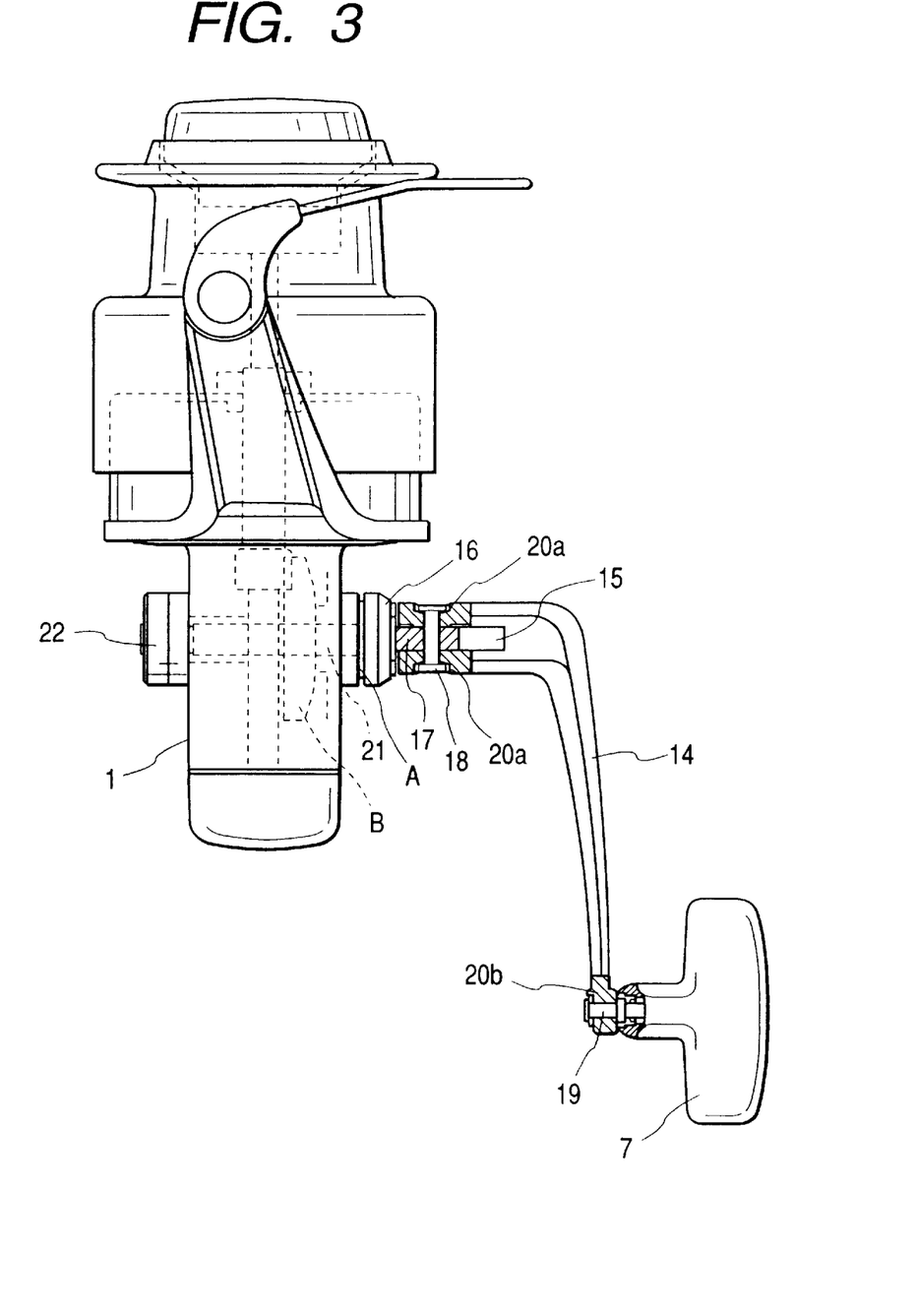
FIG. 3 is a diagram showing another example of the fishing reel incorporating the component member according to the present invention.

FIG. 3 is a schematic view showing a case in which the component member of a fishing reel according to the present invention is a handle of a spinning reel. In FIG. 3, reference numeral 21 represents a shaft which penetrates the reel body 1 so as to be connected to a reel operating member B disposed in the reel body 1. A handle stand 17 is joined to either end of the shaft 21. A cap 22 for preventing exposure of the shaft 21 is joined to another end of the shaft 21. A cap 16 is joined between the shaft 21 and the handle stand 17 at a position opposite to the cap 22.

A handle arm 14 is joined to the handle stand 17 through a handle stopper 15. Specifically, the handle stand 17 and the handle arm 14 are connected by riveting a handle-stand rivet 18 such that folding is permitted. As is known, the handle arm 14 is permitted in a winding state and a accommodating state and is permitted to move ups and downs due to operating the handle stopper 15. A handle knob 7 is joined to the distal end of the handle arm 14. Specifically, the handle arm 14 and the handle knob 7 are rotatively connected to each other such that separation is prevented by riveting a handle-knob rivet 19 to the handle arm 14. In order to prevent damage of the corrosion prevented layer of the handle arm 14 when the handle-stand rivet 18 and the handle-knob rivet 19 are riveted, washers 20a and 20b are interposed between the handle arm 14 and the handle-stand rivet 18 and between the handle arm 14 and the handle-knob rivet 19, respectively.

In the spinning reel having the structure shown in FIG. 3, main bodies of the handle arm 14, the handle stopper 15 and the handle stand 17 are made of the Mg alloy. Moreover, a corrosion prevented layer is formed on the Mg alloy. The electrode potential difference of the Mg alloy and the metal members which is in contact with the forgoing member formed by the Mg alloy or disposed adjacent to the same (for example, 1 mm or shorter) is preferably 1 V or lower. The foregoing material is exemplified by an Al alloy (0.7 V to 0.9 V) and a Zn alloy (0.5 V to 0.9 V). Therefore, this embodiment has a structure that the cap 16, the handle-stand rivet 18 and the handle-knob rivet which are located adjacent to the handle arm 14, the handle stopper 15 and the handle stand 17 are made of the Al alloy.

The component member of a reel according to the present invention has a structure that the corrosion prevented layer is formed on the member formed by the Mg alloy. When the riveted portions are included as described above, the rivets 18 and 19 and the washers 20a and 20b, and the Mg alloy portions of the component member (which is the handle arm 14) are sometimes brought into contact with one another. In the foregoing case, the material of the members which are brought into contact with the Mg alloy may be selected so that the electrode potential between the Mg alloy and the above-mentioned material is 1 Y or lower. Therefore, it is preferable that the material of the rivets 18 and 19 and the washers 20a and 20b is an Al alloy or a Zn alloy having the difference of the electrode potential from that of the Mg alloy which is 1 V or lower. More preferably, the members 18, 19, 20a and 20b are constituted by members made of the Al alloy having an alumite film serving as an insulating layer or members made of resin of polyamide, polypropylene, polyethylene or fluorine resin.

In the structure shown in FIG. 3, since the shaft 21 is in contact with a member formed by the Mg alloy or disposed adjacent to the same, the shaft 21 is preferable made of the Al alloy or the Zn alloy, however the shaft 21 is made of stainless steel because satisfactory strength must be realized. Stainless steel has the difference in the electrode potential from that of the Mg alloy which is 1.1 V to 1.3 V which is higher than 1 V. In the foregoing case, it is preferable that the portion (portion A shown in FIG. 3) of the shaft 21 which is in contact with the member made of the Mg alloy is sealed with a sealant. As an alternative to this, the shaft made of stainless steel is subjected to a conversion process to form an insulating layer on the surface thereof. The sealant is exemplified by silicon, urethane, acrylic or epoxy resin, grease or oil. The conversion treatment is exemplified by the chromic acid treatment and the stannic acid treatment.

When the above-mentioned structure is employed, electrochemical corrosion of the member made of the Mg alloy can be prevented. Also in this example, excellent corrosion resistance similar to that obtainable from Example 1 can be realized. Corrosion resistance can be employed from a viewpoint of practical use even at a fishing spot in a severe environment in which sea-water and water easily adheres.

When the component member of a fishing reel made of the Mg alloy is combined with a member made of another metal material, for example, when a screw made of stainless steel or a driver gear made of a copper alloy is disposed, there is apprehension that contact corrosion occurs with the different metal material.

To prevent the contact corrosion, because the high-voltage anodization process (the MAGOXID process) is able to simultaneously anodize Al and Mg, a member made of the Al alloy is inserted into the member of the Mg alloy, and is subjected to the high-voltage anodization process. Thus, contact corrosion with the different metal material can be prevented. Examples of the foregoing method are shown in FIGS. 4 to 7.

Figure 4:
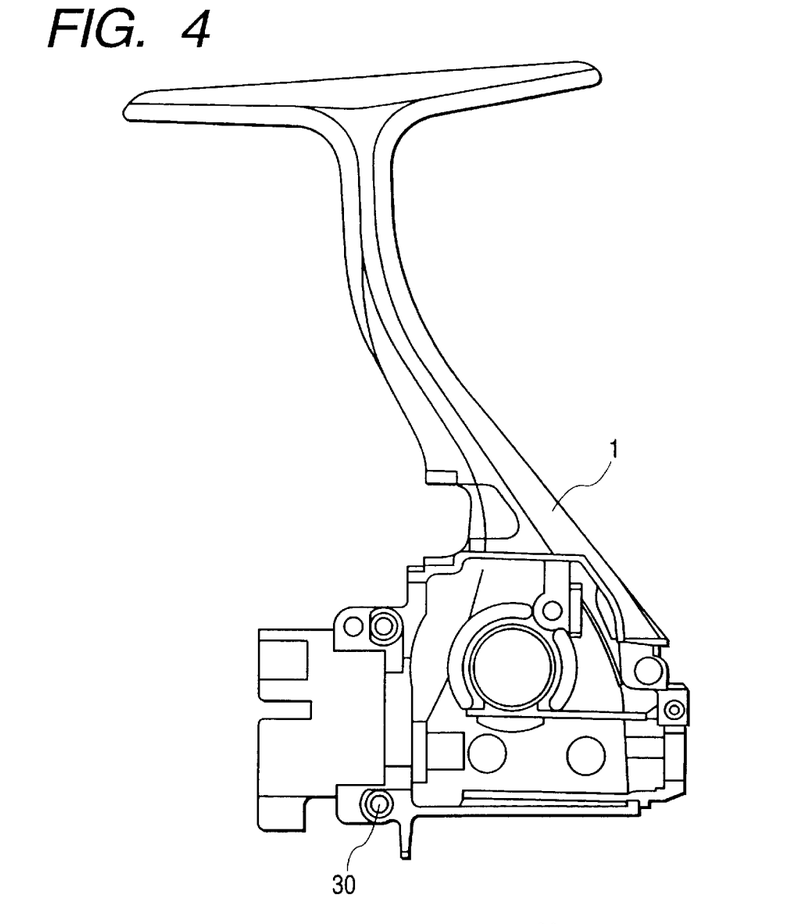
FIG. 4 is a diagram showing a second example of the fishing reel incorporating the component member according to the present invention.
Figure 5:
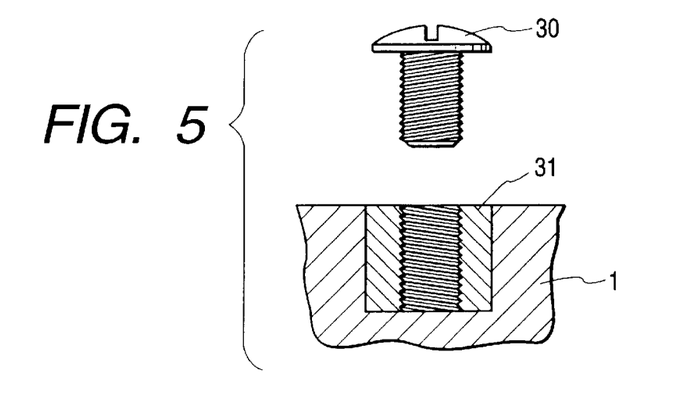
FIG. 5 is a diagram showing a portion of FIG. 4 to describe prevention of contact corrosion between different metal materials.

FIG. 4 shows a spinning reel. A screw 30 made of stainless steel is employed, the screw 30 being a screw which is joined to the reel body 1. A portion of the reel body 1 to which the screw 30 is joined has an insert 31 made of the Al alloy, as shown in FIG. 5. The insert 31 is inserted when the reel body 1 made of the Mg alloy is molded.

As described above, the reel body 1 is subjected to the high-voltage anodization process in a state which the insert 31 made of the Al alloy is provided. Thus, the Mg alloy and the Al alloy can simultaneously be anodized. As a result, even if the screw 30 made of the stainless steel is joined to the insert 31, contact corrosion between different metal materials can be prevented.

Figure 6:
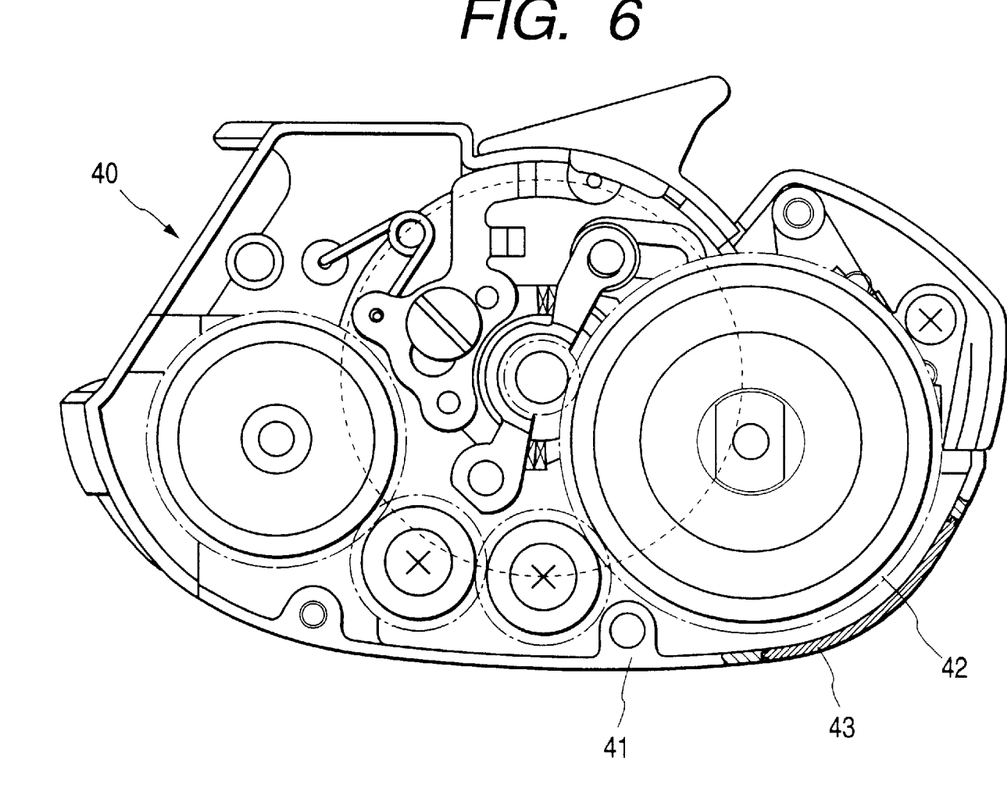
FIG. 6 is a diagram showing a third example of the fishing reel incorporating the component member according to the present invention.
Figure 7:
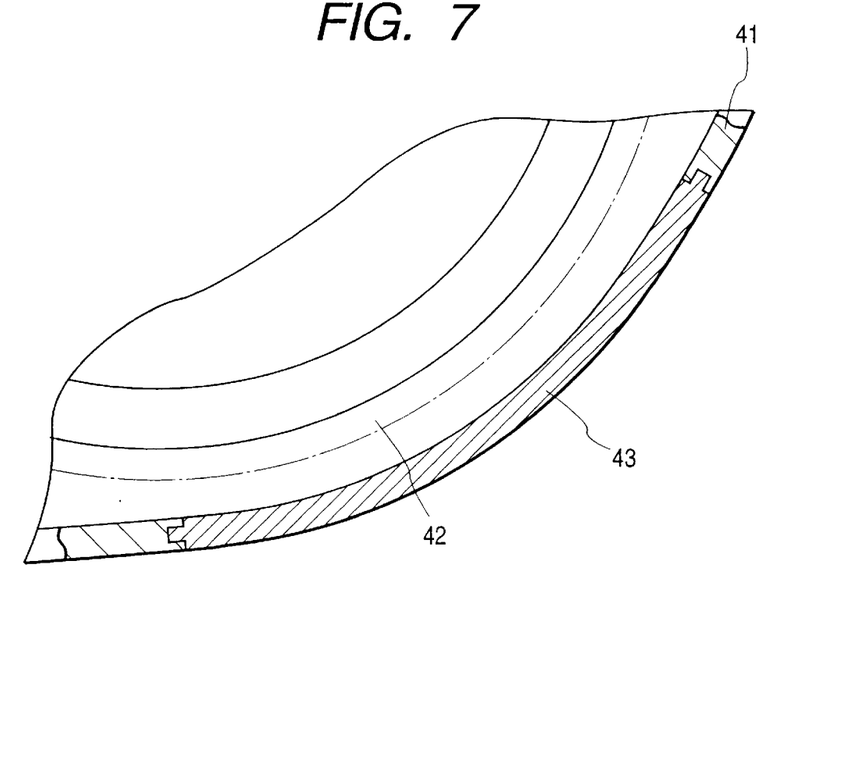
FIG. 7 is a diagram showing a portion of FIG. 6 to describe prevention of contact corrosion between different metal materials.

FIG. 6 shows a reel including two shaft at both side. A drive gear 42 is disposed in a frame 41 which constitutes a reel body 40. In the foregoing case, the frame 41 is made of the Mg alloy and the drive gear 42 is made of a copper alloy. As shown in FIG. 7, a portion of the frame 41 adjacent to the drive gear 42, that is, the portion of a rear frame has an insert 43 made of the Al alloy and disposed at a position opposite to the drive gear 42.

As described above, the frame 41 is subjected to the high-voltage anodization process in a state where the insert 43 made of the Al alloy is disposed. Thus, the Mg alloy and the Al alloy can simultaneously be subjected to the anodization process. As a result, even if the drive gear 42 made of the copper alloy is disposed in the frame 41 made of the Mg alloy, contact corrosion between different metal materials can be prevented.

Example 4

Figure 8:
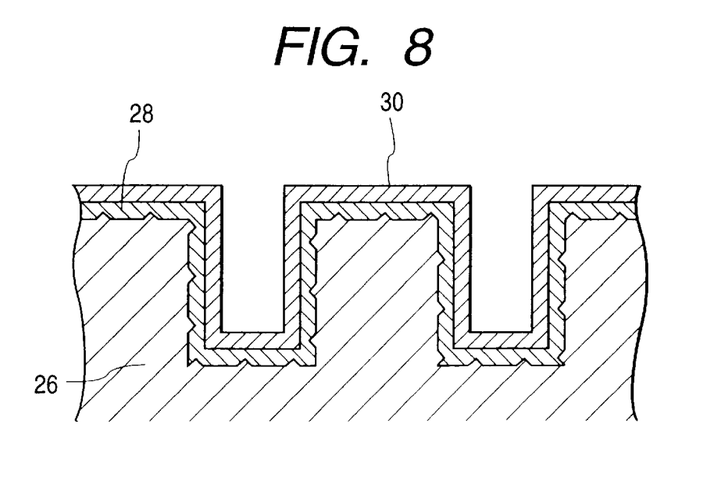
FIG. 8 is cross sectional view showing a fourth example of a component member according to present invention.

Referring to FIG. 8, a method of forming an organic coating layer 30 on a corrosion prevented layer 28 will now be described.

The organic coating layer 30 is formed by a dry coating method (a CVD method, a sputtering method, a vacuum evaporation method, an ion plating method or the like). The foregoing CVD method is performed such that an organic material is produced in a gas phase. Thus, a film (the organic coating layer 30) is formed. The sputtering method is performed such that an organic material is sputtered. Thus, a film (the organic coating layer 30) is formed. The vacuum evaporation method and the ion plating method are performed such that an organic material is evaporated. Thus, the film (the organic coating layer 30) is formed. As the thickness of the formed film is enlarged, administration of the film becomes difficult and the smoothness of the surface of the film deteriorates. Therefore, it is preferable that the thickness of the organic coating layer 30 is 1 $\mu$m to 20 $\mu$m (preferably about 5 $\mu$m). The organic material may be poly-paraxylylene, epoxy, polyurethane, polyimide, polyamide or acryl.

A method of forming corrosion prevented layer 28 on a body 26 is such as the conversion treatment, for example, the chromic acid treatment, the dichromate process or the stannate process, coating or the anodization process. In particular, a close anodized film (the corrosion prevented layer 28) can be formed by performing the HAE anodization process or the Dow 17 anodization which are types of the anodization process. Each of the foregoing anodization processes enables an anodized film having a close and hard composite oxide structure and a spinel structure to be formed. As a result, a reel for fishing exhibiting excellent corrosion resistance can be realized.

It is preferable that the thickness of the anodized film (the corrosion prevented layer 28) is 5 $\mu$m to 20 $\mu$m to maintain stable performance (the hard and close structure). If the thickness is smaller than 5 $\mu$m, the hardness of the film becomes insufficient. If the thickness is larger than 20 $\mu$m, a crack is sometimes formed during the growth of the film.

A part of the anodized film to be formed on the body of the component, where a member made of another metal material is brought into contact or is positioned adjacent to, preferably has the thickness thicker than the thickness of the other parts. For example, the thickness of the part which contacts with a member made of another material is made to be 10 $\mu$m to 20 $\mu$m, and thickness of another portion is made to be 5 $\mu$m to 20 $\mu$m.

As described above, according to this example, the organic coating layer is formed by the dry coating method on the component member subjected to the corrosion protective process. Thus, a uniform coating film can be provided for fine portions, such as small holes, thread portions and the like, having complicated shapes. Therefore, the dimensions can be controlled with great accuracy. If a defective portion is formed in which no corrosion protected film is formed because of insufficient corrosion preventive process, the dry coating method enables an insulating organic coating layer to be formed to compensate the defective portion. As a result, corrosion and the contact corrosion between different metal materials can reliably be prevented. Therefore, the function of the fishing reel can satisfactorily be maintained for a long time even at a fishing spot, the environment of which is a severe environment.

As described above, the component member of a fishing reel according to the present invention includes a body formed by a Mg alloy; and a corrosion prevented layer formed on the body by a high-voltage anodization process. Therefore, corrosion resistance which is satisfactory from a viewpoint of practical use can be realized even in a severe environment, such as a fishing spot, at which sea-water and water easily adheres. When the corrosion prevented layer is formed by the anodization process or the conversion treatment, and the sealing layer free from change in the dimensions is formed on the corrosion prevented layer, further satisfactory corrosion resistance can be realized. In addition, the harmony of the color of the corrosion prevented layer and the transparency and luster of the sealing layer enables the quality of the appearance to be improved. As a result, a fishing reel exhibiting high strength, light weight, excellent appearance and excellent operability permitted for a long time can be obtained.

What is claimed is:

1. A method of manufacturing a fishing reel including a body formed by a Mg alloy comprising the steps of:

forming a corrosion prevented layer on said body;

forming an organic coating layer on said corrosion prevented layer by a dry coating method, wherein said organic coating layer is formed with a substantially uniform thickness.

2. The method according to claim 1, wherein said corrosion prevented layer is formed by one of an impregnating process and a conversion treatment.

3. The method according to claim 1, wherein said corrosion prevented layer is formed with a thickness of about 5 $\mu$m to 20 $\mu$m.

* * * * *